June 7, 1927.  
W. E. PLANK  
1,631,332  
STEERING MECHANISM STABILIZER FOR TRAILERS  
Filed March 25, 1926  
3 Sheets-Sheet 1
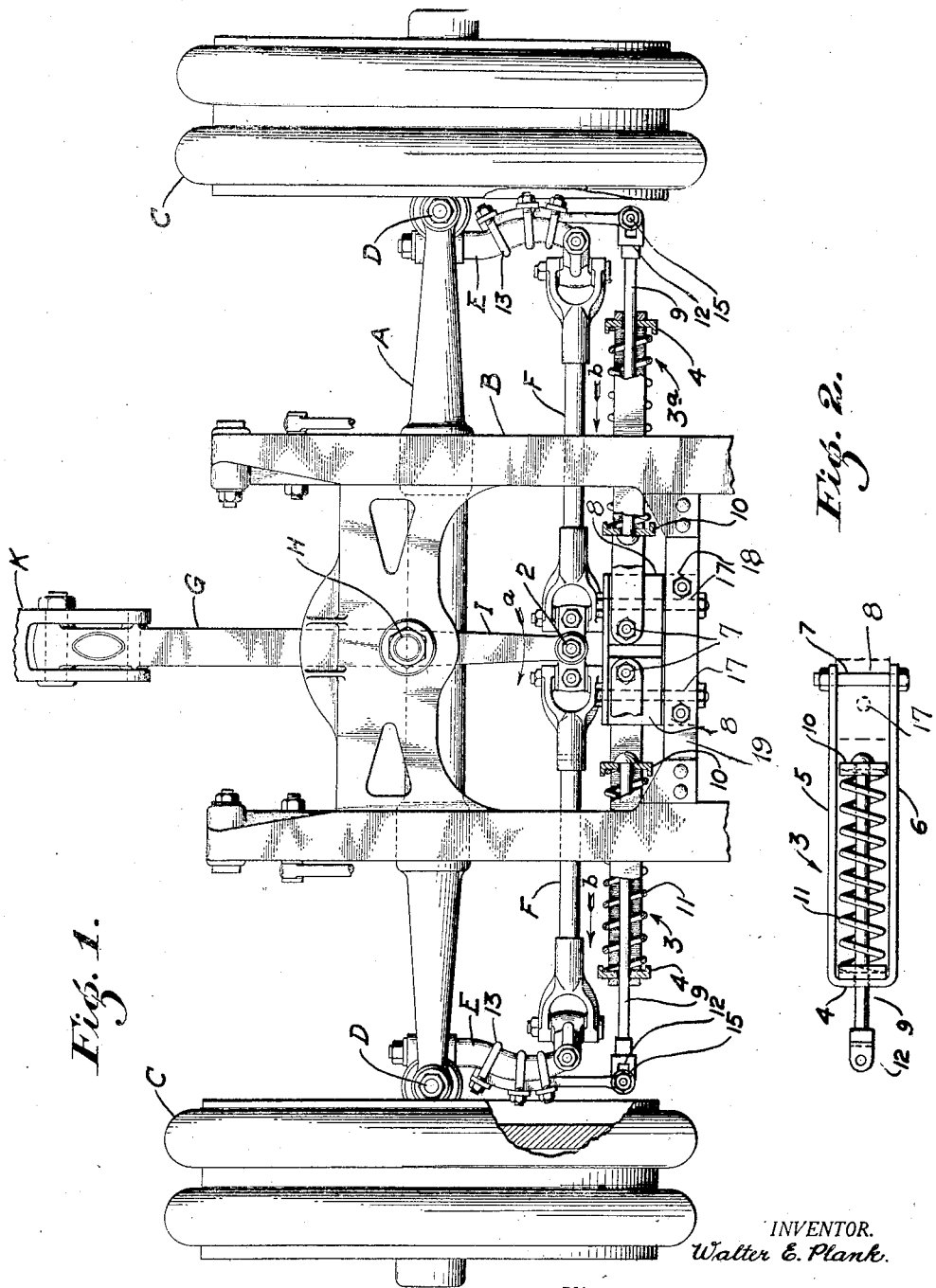
INVENTOR.  
*Walter E. Plank.*  
BY  
*Townsend, Loftus & Abbett*  
ATTORNEYS.

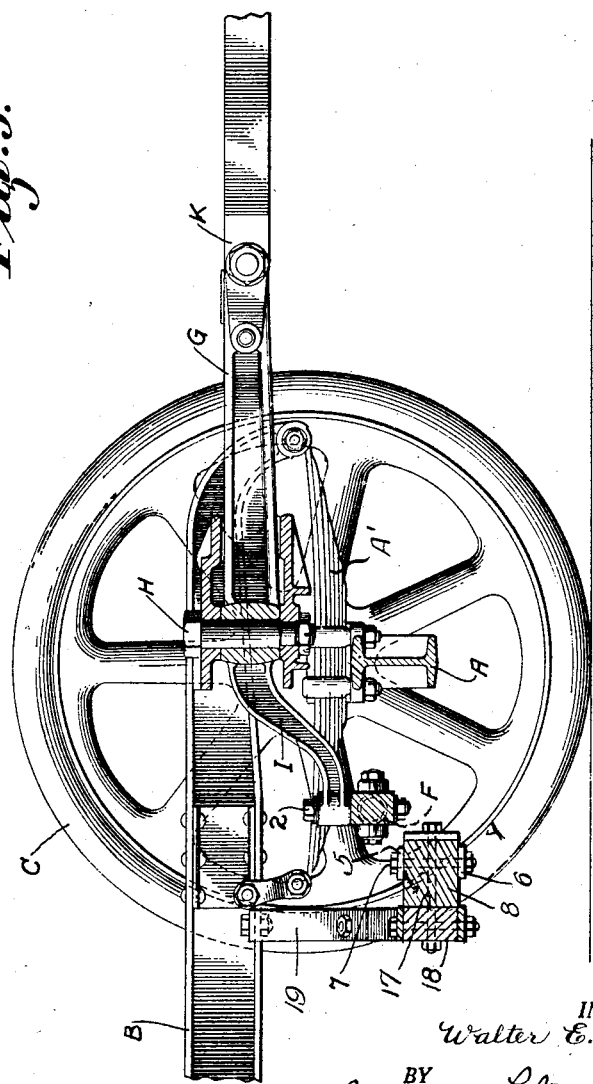

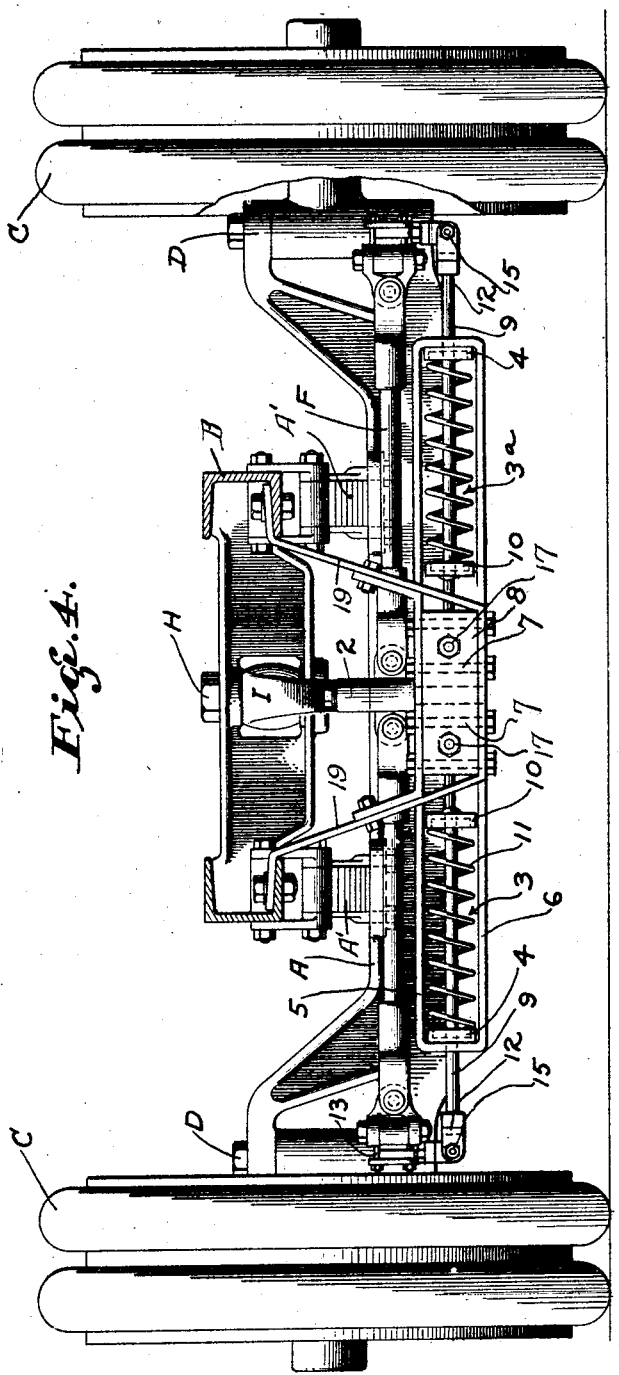

Patented June 7, 1927.

1,631,332

UNITED STATES PATENT OFFICE.

WALTER E. PLANK, OF SAN FRANCISCO, CALIFORNIA.

STEERING-MECHANISM STABILIZER FOR TRAILERS.

Application filed March 25, 1926. Serial No. 97,473.

This invention relates to trailers and especially to a stabilizer for the steering mechanism thereof.

A considerable number of trailers are in use today and a general inspection of the different makes, and interviews with actual users and operators, has proved that the general run of trailers is far from satisfactory. Where a trailer is drawn behind a tractor, or for instance, a truck, it is almost impossible to exceed a speed of twelve miles an hour as the front wheels of the trailer have a tendency to weave, sway or side-whip or, in other words, to travel in a more or less tortuous path. This side-sway or whip increases with increased speed and with increased load, and as such materially limits the maximum speed of the trailer. Said sway or whip is a serious factor as it not only reduces speed and loading capacity, but it imposes excessive strains in the steering mechanism which causes wear and lost motion and often results in breakage and wreckage.

The object of the present invention is in general to overcome the objections above specified; to improve the construction and operation of the steering mechanism of a trailer and in particular to stabilize the steering mechanism so that side-sway or whipping action may be entirely eliminated regardless of load variations or speed.

One form which my invention may assume is exemplified in the accompanying drawings, in which—

Fig. 1 is a plan view of the front end of a trailer showing the stabilizers applied to the steering mechanism.

Fig. 2 is a side elevation of one of the stabilizers.

Fig. 3 is a central vertical longitudinal section taken on line 3—3 Fig. 1.

Fig. 4 is a cross-section taken on line 4—4 Fig. 3 looking in the direction of the arrows.

Referring to the drawings in detail and particularly to Figs. 1 and 2, A indicates the front axle of a trailer or like vehicle, A' the springs, B the frame supported thereby, C the front wheels, D the steering knuckles through which turning movement is transmitted to the wheels, E the steering knuckle arms, and F the tie-rod connecting the same.

The trailer here shown is provided with a draw-bar G secured to the frame by means of a king bolt H and it is provided with a rearward extension I, through which movement is transmitted to the tie-rod F, the steering arms E and the wheels C. The draw-bar G may be directly connected to the tractor or truck pulling the same, or it may be connected thereto through an intermediate draw-bar such as illustrated at K.

A trailer, as ordinarily constructed, cannot possibly exceed a predetermined speed, nor can it be loaded beyond a predetermined capacity as side-sway or whip in the front wheels becomes so great as to render any increase either in load or speed hazardous. The side-sway or whip is caused by lost motion in the steering mechanism in this type of draw-bar control. For instance, lost motion to a small degree may be found in the connection formed between the extension on the draw-bar and the tie-rod; lost motion is again obtained between the ends of the tie-rod and the respective steering arms, and more or less lost motion may also be encountered in the steering knuckles and the wheel spindles. While the lost motion is in each connection made fairly small, it is obvious that it is multiplied through the different connections, and it is this multiplied lost motion which causes and permits side-sway of the front or steering wheels. This side-sway, as previously stated, increases with speed changes and load increase, and limits the maximum speed of the trailer, as the strain and pull on the steering mechanism when certain speeds and loads are exceeded, becomes so great as to cause excessive wear, and in many cases breakage and wrecks.

To overcome these objectionable features a pair of stabilizers 3 and 3ª have been provided. The stabilizers are perhaps best illustrated in Figs. 2 and 4. Both stabilizers are similar or identical in construction and the description of one should therefore suffice. Referring to Fig. 2, it will be noted that the stabilizer consists of a U-shaped section of strap-iron consisting of an end section 4, a top and bottom section 5 and 6 respectively which are pivotally secured as at 7 to a bearing block 8. Extending through the end section 4 and freely slidable therein is a rod 9. Mounted on the inner end thereof is a cap or head member 10, and interposed between said head and the end section 4, is a helical compression spring 11. Formed on the outer end of the rod 9 is a fork-shaped member 12 and this is pivotally secured to the lower end of a bolt 15, which in turn, is turnably mounted in the end of the steering arm E. This connection forms a universal or swivel joint and permits perfect freedom of movement when the frame rises and falls with relation to the axle A due to the spring suspension provided. The inner end of the stabilizer, or the member consisting of the arms 5 and 6, is pivotally connected in the bearing block 8. This block is in turn pivotally mounted on a bolt 17 which extends through a second block 18 which is supported with relation to the main frame by means of a downwardly extending yoke or strap 19. The members 5 and 6 pivot about the bearing block 8 in a horizontal direction and as the block in turn pivots on the pin 17 a universal connection is also formed at this point.

The stabilizer shown at 3ª is, of course, attached and mounted in the same manner and as they are both universally connected at their outer ends to the steering arms and at their inner and adjacent ends to the block 18, it is obvious that perfect freedom of movement is obtained when the main frame rises or falls with relation to the axles due to the spring support provided or indicated at A'.

In actual practice it will be noted that the front wheels of the trailer will not be affected by any lost motion through the several connected parts of the steering mechanism as the steering arms of the respective wheels are normally held in a straight-line position by the equal pull of the compression springs 11 of the stabilizers. The wheels are, however, permitted to turn with the draw-bar as movement is then imparted to the steering arms through the extension I of the draw-bar and the tie-rods F. Movement of the draw-bar extension in the direction of arrow $a$ will cause the tie-rods to move in a direction of arrow $b$. This will cause compression of the spring mounted in the stabilizer 3 and will permit extension of the spring carried by the stabilizer 3ª. Reverse movement of the draw-bar and tie-rods will conversely cause compression of the spring and the stabilizer 3ª and extension of the spring and stabilizer 3. Comparatively little resistance is offered to the swinging motion of the draw-bar and the tie-rods as the motion of the springs is opposite and to that extent substantially equalizes each other.

In actual practice, with the trailer unloaded, the main supporting springs A' will assume their extended position and the main frame its highest position with relation to the axle. In this position of the main frame the stabilizers 3 and 3ª will assume the substantially horizontal position as shown in Fig. 4, and the tension placed upon the springs 11 is sufficient to take care of all those lost motions in the steering connections. Experience has, however, established the fact that side-whip has a tendency to increase when the trailer is loaded and it is accordingly important that the tension of the springs 11 be increased. This is automatically taken care of in the present instance as loading of the main frame causes compression of the main supporting springs A'. This lowering movement of the main frame is transmitted through the yoke arms 17 to lower the block 18 and the bearing blocks 8 and the stabilizers will thereby assume a slightly downward inclined position. Such movement of the stabilizers causes compression of the springs 11 and the pressure exerted thereby is accordingly increased in proportion to the load applied.

Experience has shown that when the stabilizers were disconnected a speed beyond twelve miles an hour was practically impossible, as the side-sway of the wheels became so excessive as to render any further increase in speed dangerous. The moment, however, that the stabilizers were connected or applied it was found that the speed could be increased to thirty and thirty-five miles an hour without producing any perceptible side-whip or sway in the front wheels of the trailer. It was also found that the load could be increased or decreased without producing any side-sway. This was found to be due to the fact that the tension of the springs 11 increased as the load was increased. In other words, the speed of the trailer could be practically doubled and the load could be changed as desired as the side-sway or whip of the wheels was so small as to hardly be noticeable. This is obviously exceedingly important as it removes all excess strains in the steering mechanism thereby eliminating danger of breakage or wreckage, reducing wear to a minimum, and above all, permitting a material increase in load carrying capacity and in road speed.

While certain features of my invention have been more or less specifically described and illustrated I wish it understood that certain changes may be resorted to within the scope of the appended claims. I also wish it understood that the material and finish of the various parts employed may be such as the experience and judgment of the manufacturer may dictate or various conditions may demand.

Having thus described my invention what I claim and desire to secure by Letters Patent is—

1. In a vehicle of the character described, an axle, steering wheels pivotally mounted on the ends thereof, a main frame resiliently supported with relation to the axle, a draw-bar pivotally connected with the frame, means connected with the draw-bar for controlling the movement of the pivoted steering wheels, and resilient means interposed between the steering wheels and the frame tending to normally maintain the wheels in a straight ahead position.

2. In a vehicle of the character described, an axle, a steering knuckle on each end thereof, a wheel carried by each steering knuckle, a steering arm on each knuckle, means for imparting a steering movement to the steering arms, a pair of springs connected at their outer ends with the steering arms, and at their inner ends to a support, a load carrying frame supported with relation to the axle, and means whereby the tension of the springs may be increased when the load placed on the frame is increased.

3. In a vehicle of the character described, the combination with the front wheels and the steering arms whereby they are actuated, of a draw-bar pivotally connected with the vehicle frame, means for transmitting swinging movement of the draw-bar to the steering arms and wheels, spring means operable independently thereof tending to maintain the steering arms and wheels in a straight ahead position, and means for automatically increasing or decreasing the tension of said spring means.

4. In a vehicle of the character described, the combination with the front wheels and the steering arms whereby they are actuated, of a draw-bar pivotally connected with the vehicle frame, means for transmitting swinging movement of the draw-bar to the steering arms and wheels, spring means operable independently thereof tending to maintain the steering arms and wheels in a straight ahead position, said means comprising bearing blocks pivotally secured to the frame of the vehicle, a pair of U-shaped members pivotally secured at their inner ends to said blocks, a rod slidably mounted in each U-shaped member, a head member on each rod, a helical spring interposed between each U-shaped member and head member and normally maintained under compression, and a universal connection between each rod and steering arm.

WALTER E. PLANK.